B. P. SHIPPY.
TRACTOR.
APPLICATION FILED SEPT. 4, 1920.
1,371,938.
Patented Mar. 15, 1921.
3 SHEETS—SHEET 1.
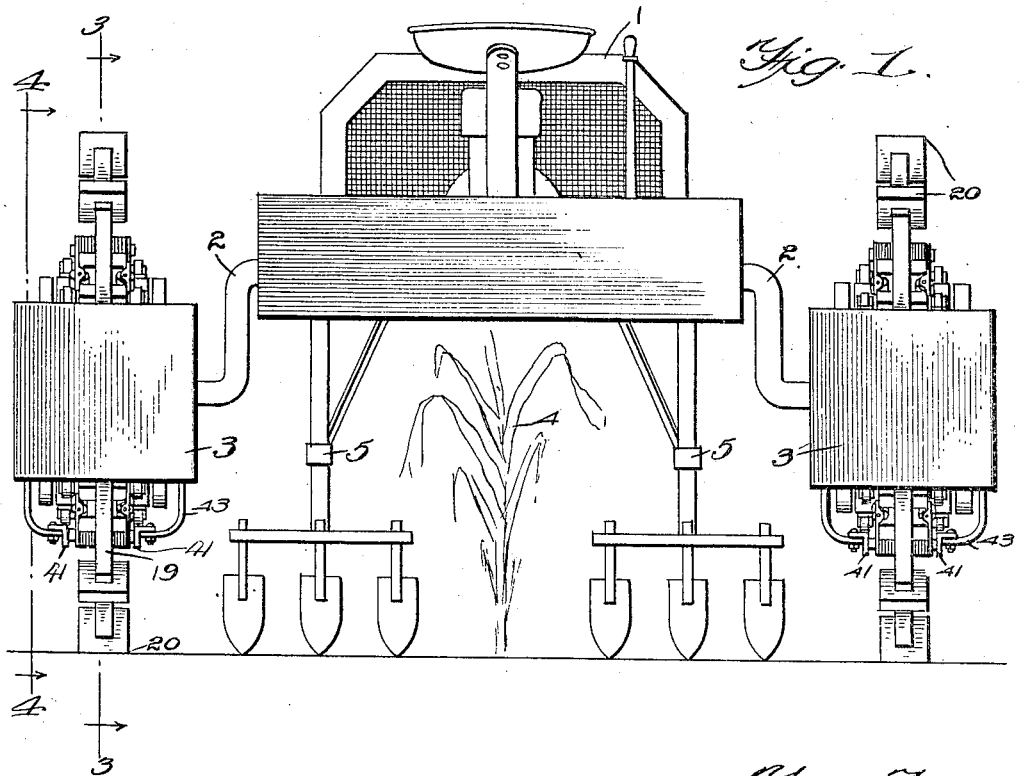
Fig. 1.
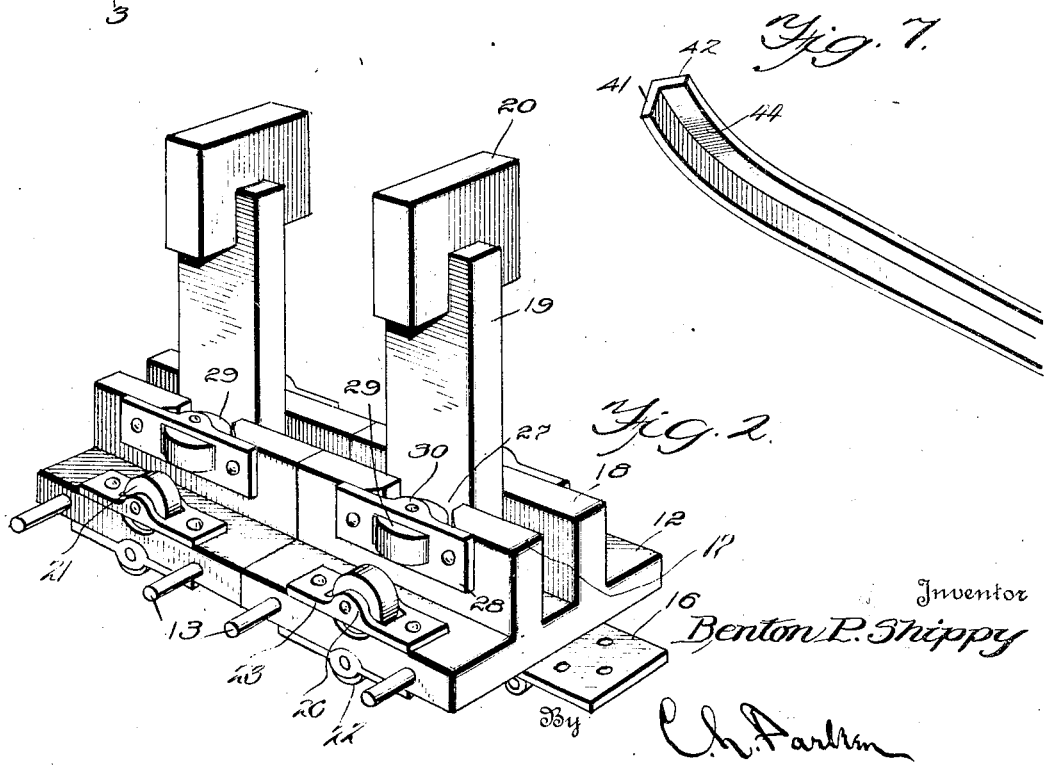
Fig. 2.
Fig. 7.
Inventor
Benton P. Shippy
By
Attorney

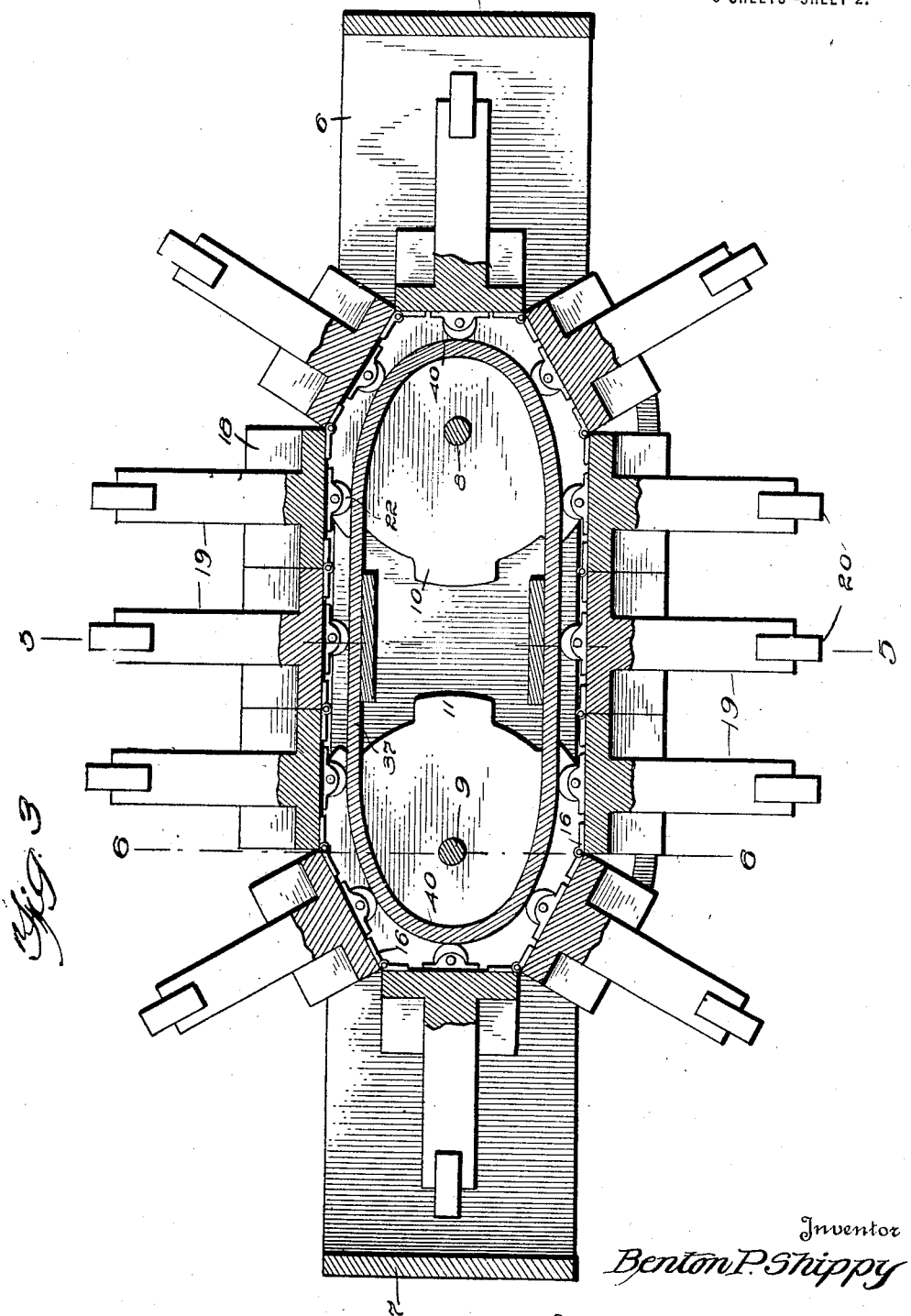

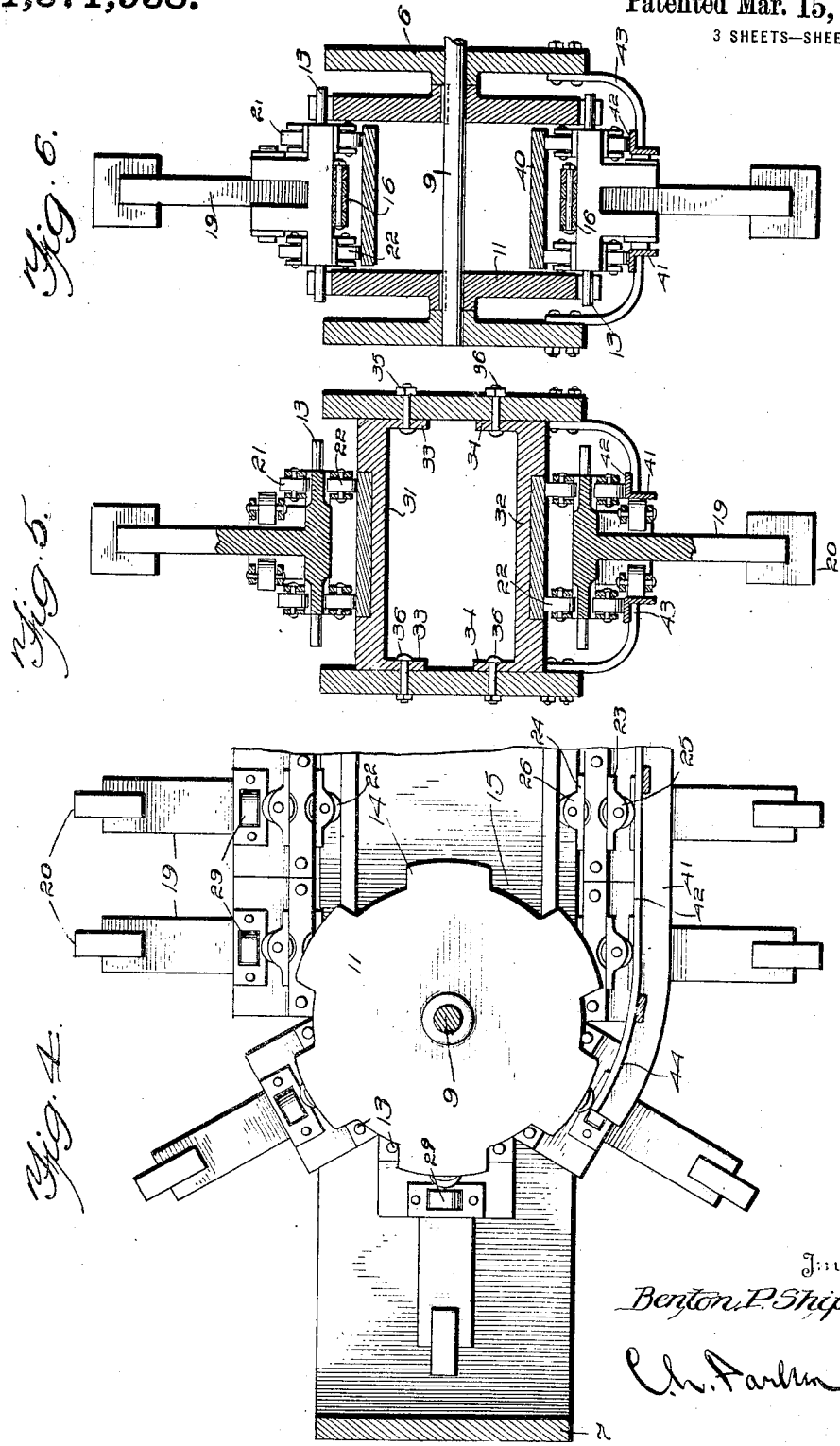

UNITED STATES PATENT OFFICE.

BENTON P. SHIPPY, OF CASPER, WYOMING.

TRACTOR.

1,371,938.

Specification of Letters Patent. Patented Mar. 15, 1921.

Application filed September 4, 1920. Serial No. 408,149.

*To all whom it may concern:*

Be it known that I, BENTON P. SHIPPY, a citizen of the United States, residing at Casper, in the county of Natrona and State of Wyoming, have invented certain new and useful Improvements in Tractors, of which the following is a specification.

This invention relates to tractors, and it comprises a pair of traction members adapted to be arranged on each side of a tractor body, each of said members comprising end and side walls, a pair of shafts arranged in each of said members, sprockets mounted on said shafts, an endless belt or chain passing over said sprockets, a plurality of independent ground engaging elements projecting outwardly a considerable distance to space the body of the tractor from the ground and being provided with enlargements engaging the ground, supports for said chain, and rollers carried by said chain and engaging said supports; all as more fully hereinafter set forth and as claimed.

In the present invention, I have devised traction means which may be advantageously employed in connection with farm implements, the traction members being disposed on each side of the body of the tractor to support the tractor above the ground, whereby the tractor may travel through a field with the traction members in the spaces between the rows and the tractor straddling the rows to carry suitable agricultural implements, such as cultivators, plows, etc.

The traction members are provided with a plurality of individual ground engaging elements or legs having enlarged ends to engage the ground and being capable of traveling on hard or soft earth. The provision of ground engaging elements or legs is advantageous in that the tractor does not make a continuous track as it passes over the ground. When a tractor, provided with a continuous tread, passes over the ground, it mashes or flattens the ground at the point of contact and each engaging section, as it comes in contact with the ground, is forced to climb a slight incline from the flattened track made by the previous engaging section.

The invention further comprises means for driving the traction elements, comprising a pair of sprocket wheels and an endless belt or chain, carrying the ground engaging elements, the belt or chain being provided with rollers adapted to engage suitable supports on the frame of the traction element to provide easy running and reduce friction.

In the accompanying drawings, I have shown an advantageous embodiment of the invention. In this showing:

Figure 1 is a front elevation of a tractor showing a traction member arranged on each side thereof, Fig. 2 is a detail perspective view of a portion of a traction member, Fig. 3 is a vertical longitudinal sectional view on the line 3—3 of Fig. 1, Fig. 4 is a similar view on the line 4—4 of Fig. 1, Fig. 5 is a vertical transverse sectional view on the line 5—5 of Fig. 3.

Fig. 6 is a similar view on the line 6—6 of Fig. 3, and

Fig. 7 is a detail view of a portion of one of the supporting tracks for the endless belt.

Referring to the drawings, the reference numeral 1 designates generally, a tractor which may be made of any suitable construction, and which, as shown, is provided with a pair of transverse supporting members 2, adapted to be secured to traction elements 3, arranged on each side of the tractor, the body of the tractor and the supporting elements forming a substantially U-shaped frame, whereby the body of the tractor is spaced considerable distance from the ground. If the tractor is employed in agriculture, it is advantageous to space the body of the tractor from the ground to permit it to straddle rows of corn or the like, illustrated as at 4. The tractor may support suitable agricultural implements, such as plows, cultivators, or the like, as at 5.

Referring to Figs. 2 to 7 of the drawings, wherein the traction members are illustrated in detail, each of the members comprises a suitable frame consisting of side plates 6 and end plates 7, the top and bottom being open. A pair of shafts 8 and 9 is arranged transversely of the frame, one of the shafts being connected to a source of power, such as an engine carried by the tractor, in any suitable manner (not shown). Sprocket wheels 10 and 11, respectively are arranged on the shafts 8 and 9. An endless belt consisting of plates or members 12 is adapted to engage the sprocket wheels and be actuated thereby. As shown, each of the plates is provided with a plurality of laterally projecting pins 13, adapted to engage the depressions in the surface of the sprocket wheel, the pins on one plate being spaced from each other to receive one of the projections 14 on the sprocket wheel therebetween, and being so spaced with relation to the pin on the next adjacent plate that a pair of such pins on adjacent plates may be received in a single depression 15 (see Fig. 4). The plates of the belt are connected to each other by hinges 16 to permit relative movement. Each of the plates is provided with a pair of spaced ribs or projections 17 and 18, the body portion 19 of the laterally projecting ground engaging element being arranged therebetween. The outer end of the ground engaging element is provided with a tread member 20 of greater width than the body portion. It will be noted from an inspection of Figs. 3 and 4 of the drawings that the ground engaging elements are spaced a considerable distance from each other, and do not make a continuous track as the tractor passes over the ground. The plates 12 are provided with recesses on their upper and lower faces, the roller 21 being adapted to be arranged in the recess in the upper face and a roller 22 in the recess in the lower face. As shown, supporting members 23 and 24 are arranged over these recesses, the supporting members being provided with openings registering with the recesses and with ears 25 and 26, adapted to form bearings for the shafts of the rollers. Similarly, the projecting ribs 17 and 18 are provided with recesses 27 which are covered by plates 28 having openings therein, registering with the recesses. Rollers 29 are arranged in the recesses and openings, the shafts of the rollers being journaled in ears 30 carried by the plates 28.

Intermediate the ends of the frame, there is provided a pair of transverse supporting and spacing plates 31 and 32. These plates are secured to the side members in any suitable manner. As shown, the plates are provided with end flanges 33 and 34, adapted to receive fastening elements 35 and 36, passing through the flanges and the side plates. Suitable supporting means for the endless belt are provided, consisting of a plate 37 arranged between the side plates and extending around the shafts 8 and 9, the plate being curved at each end, as at 40, to provide an endless supporting track suitably spaced from the belt when the belt is in proper position and adapted to be engaged by the lower rollers 22. The provision of a supporting member 37 and the rollers 22 provides positive supporting means for the traction elements, prevents sagging of the chain, and reduces friction. Additional guiding and supporting tracks are provided, adapted to engage the upper rollers 21 and the rollers 29 carried by the ribs 17 and 18.

As shown, the auxiliary guiding and supporting means consist of a substantially L-shaped member having a vertical portion 41 and a horizontal portion 42, the horizontal portion being adapted to engage the rollers 21 and the vertical portion to engage the rollers 29. This auxiliary track is supported from the side members by suitable brackets 43. A pair of these auxiliary tracks may be provided, arranged on each side of the belt. The engagement of the vertical portion of the track and the rollers 29 forms a guide for the belt to overcome or prevent lateral shifting. The end of the auxiliary track is curved as at 44. As shown, the auxiliary track is arranged on the under side of the traction member, adapted to engage the belt during its operative flight. However, if desired, the auxiliary track may be extended entirely around the belt and suitably spaced therefrom to engage the rollers throughout the entire travel of the belt.

The tractor herein disclosed is suitable for use in many ways. It is particularly adapted for agricultural work wherein the body of the tractor is spaced from the ground straddling the rows. Spacing of the body of the tractor prevents damage to the rows of growing vegetables, the traction members being provided with ground engaging elements extending a considerable distance from the body portion and capable of use on hard or soft ground. When used on soft earth, the ground engaging elements are prevented from sinking to any considerable distance below the surface of the ground by the extreme width of the tread members 20. A slight sinking into the ground by the traction members does not, in any way, interfere with the operation of the tractor. When the tractor is in operation, each of the tread members 20 carried by the ground engaging elements 19, engages the ground independently of the other elements, and they are so spaced from each other that the tractor does not make a continuous track. Where a tractor travels on a tread consisting of a number of connected elements, a continuous track is made on the ground, and the ground flattened. A tractor of this character requires considerable more power for operation because, as each succeeding element comes in contact with the ground, it is forced to raise the tractor from the depression created by the preceding element.

Although I have described and illustrated the traction members in connection with the tractor employed for agricultural purposes, its use is in no way limited to this field and it may be employed in connection with tractors used in many other ways. The individual and independent ground engaging elements produce a very positive drive for all uses, and the improved manner of supporting the endless chain to reduce friction and provide positive driving means is highly advantageous and efficient.

It is to be understood that, while I have described the preferred embodiment of my invention, various changes in the shape, size, and arrangement of parts may be resorted to without departing from the spirit of the invention or the scope of the subjoined claims.

Having thus described my invention, I claim:

1. A tractor embodying a pair of traction members located upon opposite sides of a tractor body, each of said traction members comprising a casing formed of spaced side walls, a pair of shafts arranged in said casing, sprocket wheels arranged on said shaft, an endless chain arranged in the casing and engaging said sprocket wheels, ground engaging elements carried by said chain, a set of rollers arranged on the upper face of said chain, a second set of rollers arranged on the upper face of said chain and at right angles to said first mentioned rollers, supporting members secured to said side walls, said supporting members comprising substantially L-shaped tracks adapted to receive said first and second mentioned rollers, a set of rollers arranged on the lower face of said chain, and supporting means positioned near said rollers and adapted to be engaged thereby.

2. In a device of the character described, the sub-combination which comprises an endless chain formed of a plurality of hinged plates, rollers mounted in the upper and lower faces thereof, ground engaging elements carried by each of said plates, a pair of spaced longitudinal ribs arranged on each side of said ground engaging elements, rollers mounted in said ribs at right angles to said first mentioned rollers, and supporting means for said chain adapted to engage said rollers.

3. A traction member comprising a casing formed of spaced side walls, a pair of shafts arranged in said casing, sprocket wheels arranged on said shaft, an endless chain arranged in the casing and engaging said sprocket wheels, ground engaging elements carried by said chain, a set of rollers arranged on the lower face of said chain, supporting means arranged on the casing and adapted to be engaged by said rollers, a set of rollers arranged on the upper face of said chain, a second set of rollers arranged on the upper face of said chain and disposed at right angles to said first mentioned rollers, and supporting means carried by said casing and adapted to be engaged by the two sets of rollers arranged on the upper face of the chain.

In testimony whereof I affix my signature in presence of two witnesses.

BENTON P. SHIPPY.

Witnesses:
WILLIAM O. WILSON,
ROBERT N. OGDEN, Jr.